United States Patent [19]

Comstock et al.

[11] Patent Number: 5,047,154
[45] Date of Patent: * Sep. 10, 1991

[54] METHOD AND APPARATUS FOR ENHANCING THE FLUX RATE OF CROSS-FLOW FILTRATION SYSTEMS

[75] Inventors: Daniel L. Comstock, Corvallis; Robert D. Hagen, Dallas, both of Oreg.

[73] Assignee: C.P.C. Engineering Company, Sturbridge, Mass.

[ * ] Notice: The portion of the term of this patent subsequent to Jun. 2, 2004 has been disclaimed.

[21] Appl. No.: 99,622

[22] Filed: Sep. 21, 1987

Related U.S. Application Data

[63] Continuation of Ser. No. 474,817, Mar. 10, 1983, abandoned.

[51] Int. Cl.$^5$ .............................................. B01D 61/22
[52] U.S. Cl. ................................... 210/636; 210/651; 210/321.69
[58] Field of Search ............... 210/651, 637, 134, 636, 210/321.69, 321.65

[56] References Cited

U.S. PATENT DOCUMENTS

| | | | |
|---|---|---|---|
| 3,839,201 | 10/1974 | Miller | 210/637 |
| 3,853,756 | 12/1974 | Staha | 210/637 X |
| 3,974,068 | 8/1976 | Boner et al. | 210/34.84 X |
| 4,105,547 | 8/1978 | Sandblom | 210/22 |
| 4,136,025 | 1/1979 | Zwack et al. | 210/636 X |
| 4,243,530 | 1/1981 | Lehnhoff et al. | 210/321.61 X |
| 4,412,553 | 11/1983 | Kupp et al. | 210/637 X |
| 4,435,289 | 3/1984 | Breslau | 210/637 |
| 4,579,662 | 4/1986 | Jonsson | 210/636 |
| 4,670,150 | 6/1987 | Hsiung et al. | 210/638 X |

FOREIGN PATENT DOCUMENTS

| | | |
|---|---|---|
| 981595 | 1/1976 | Canada . |
| 2187389 | 1/1974 | France . |
| 2295777 | 7/1976 | France . |
| 2316995 | 2/1977 | France . |
| 51-69487 | 6/1976 | Japan ................................. 210/636 |
| 0087064 | 8/1978 | Japan ................................. 210/637 |

OTHER PUBLICATIONS

Chemical Engineering Progress, vol. 71, No. 12, Dec., 1975, pp. 74–80.
Chemical Engineering, vol. 87, No. 24, Dec. 1, 1980, European Search Report.

*Primary Examiner*—Frank Spear
*Attorney, Agent, or Firm*—Finnegan, Henderson, Farabow, Garrett & Dunner

[57] ABSTRACT

A method of increasing the time-averaged cross-flow filtration flux of a liquid through a porous filter medium over the period of a filtration run, comprising the steps of: (a) flowing the liquid transversely through the filter medium by establishing a pressure differential across the filter medium; and (b) maintaining the filtration flux rate through the filter medium at a preselected substantially constant value during the entire filtration run by applying a variable throttling pressure on the filtrate side of the filter medium and reducing the throttling pressure during the run to control the instantaneous value of the pressure differential as required to maintain the preselected flux rate, such flux rate being greater than the equilibrium flux rate.

Also, a method of increasing the time averaged cross-flow filtration flux of a liquid through a porous filter medium, typically filter tubes, over the period of a filtration run, comprising the steps of flowing the liquid transversely through the filter medium by establishing a pressure differential across the filter medium, and commencing the filtration run by gradually increasing the flow rate over a sufficiently extended period of time to substantially prevent the intrusion of the particles of material being filtered out of the liquid into the filter medium per se.

18 Claims, 8 Drawing Sheets

METHOD AND APPARATUS FOR ENHANCING THE FLUX RATE OF CROSS-FLOW FILTRATION SYSTEMS

This application is a continuation of application Ser. No. 474,817, filed Mar. 10, 1983, now abandoned.

BACKGROUND OF THE INVENTION

The present invention relates to cross-flow filtration for removal of suspended and colloidal solids and/or emulsified oil from liquids, particularly, water, wastewater, industrial wastes, and industrial process streams. More specifically, the invention relates to a method and apparatus for increasing the time-averaged rate of transfer of liquids containing such solids and/or oil across a cross-flow filtration medium (referred to herein as the "time-averaged filtration flux").

In water and wastewater treatment, clarifiers and through-flow filters are conventionally used for removal of suspended and colloidal solids. Such systems have inherent disadvantages. Without preclarification, most filters are unable to handle the resulting higher solids loadings. Likewise, even with a clarifier in the process train, filtered particles continuously accumulate on and within through-flow filter media. The filter flux rate decreases with time (or headloss increases) and frequent backwashing is required to remove the accumulated solids from the filter medium. When product water is used for back-washing there is a significant net decrease in total water production. Relatively large volumes of low solids wastewater are also created which must receive some type of further handling. There is also the problem of filter breakthrough. Moreover, water quality is extremely process dependent.

Cross-flow filtration is substantially different from through-flow filtration, in that feed water is introduced parallel to the filter surface, and filtration occurs in a direction perpendicular to the direction of the feed flow. Cross-flow filtration satisfies a much wider range of applications and provides economic benefits that other conventional options do not. Cross-flow filtration systems are capable of clarification, filtration, and thickening in one process step. Equipment costs approach those of direct filtration; yet cross-flow filtration is capable of filtering streams that contain suspended solids concentrations of 10,000 mg/L or higher. Furthermore, cross-flow systems require less space than conventional systems. Cross-flow filtration systems include membrane systems such as microfiltration, reverse osmosis and ultrafiltration. The major disadvantages of the latter two membrane processes in liquids-solids separation are low flux rates and susceptibility to fouling. These liabilities ultimately translate into high system construction and operating costs. However, both of these problems have been virtually eliminated in a new method of cross-flow microfiltration utilizing thick-walled porous thermoplastic tubes sold under the trademark HYDROPERM TM. The filtration characteristics of these tubes combine both the "in-depth" filtration aspects of multi-media filters and the "thin-skinned" aspects of membrane ultrafilters. The porosity of HYDROPERM TM tubes results from the open cell reticulated structure of the tube wall. HYDROPERM TM tubes differ from conventional membrane ultrafilters, in that they have pore sizes on the order of several microns, wherein the length of a pore is many times that of its diameter. These tubes are described in greater detail, for example, in "HYDROPERM TM CROSS FLOW MICROFILTRATION", Daniel L. Comstock, et al., Neptune Microfloc, Inc. Report No. KT 7307, May 1982, and in Report No. 77-ENAS-51 of the American Society of Mechanical Engineers, entitled "Removal of Suspended and Colloidal Solids from Waste Streams by the Use of Cross-Flow Microfiltration", which reports are hereby incorporated herein by reference to the extent necessary for a thorough understanding of the background of the invention.

Feed flow is through the center of HYDROPERM TM tubes at a relatively low pressure, typically less than 30 psi. The filtrate is typically collected in a jacket surrounding the exterior tube wall and withdrawn therefrom by a product line. As feed flow circulates through the tube, solid particles are slowly driven with the product flow toward the tube wall. Thus, the concentration of particles in regions close to the wall steadily increases.

In cross-flow filtration systems generally, because the direction of the feed flow is tangential to the filter surface, accumulation of the filtered solids on the filtering medium is reduced by the shearing action of the flow. Cross-flow filtration thus affords the possibility of a quasi-steady state operation with a nearly constant flux when the driving pressure differential is held constant. Unfortunately, this theoretical possibility has not been achieved in practice. Thus, the problem of declining filtration fluxes has plagued conventional cross-flow filtration systems.

In general, any liquid from which suspended solids removal is desired will contain a wide range of particulate sizes, ranging in effective diameter from several microns down to colloidal dimensions. Because of the "in-depth" filtration characteristics of thick-walled, thermoplastic tubes, such as HYDROPERM TM tubes, particles smaller than the largest pore size of the tube may, under certain circumstances, enter the wall matrix. In any event, above a certain solids concentration in the feed, the majority of the suspended solids are retained at the inner wall of the tube and quickly form a dynamic membrane (also referred to as a "filter cake" or "sludge layer"). The dynamic membrane is, we believe, largely responsible for the filtration which subsequently occurs.

Those particles initially entering into the wall matrix ultimately become entrapped within it, because of the irregular and tortuous nature of the pore structure. As microfiltration proceeds, penetration of additional small particles into the wall matrix is inhibited by the presence of the dynamic membrane. The formation of the dynamic membrane, together with the possible clogging of the pore structure of the tube by entrapped particles, results in a decline in the filtration flux. In conventional systems, this decline is approximately exponentially related to filtration time.

In view of the fact that an increase in filtration flux will permit far more economical processing of solids laden liquids, the art has sought methods for inhibiting the above-described filtration flux decline in cross-flow filtration systems and/or for restoring the filtration flux in such systems to a higher value, after it has declined.

Various cleaning techniques have previously been investigated for restoring the filtration flux value. Such cleaning techniques have involved chemical and/or physical cleaning of the surface of the filter medium. For example, chemical solvents have been used to dissolve the layer-building filtered particles so as to yield a clean, layer-free filter surface. Hydrochloric acid and other acids are examples of solvents commonly being used. On the other hand, a simple physical cleaning technique commonly used is backflushing of the filter medium, i.e., temporary reversal of the filtrate flow direction. This cleaning technique is frequently used in conjunction with cross-flow filtration processes utilizing hollow tubular filters. Another physical cleaning technique employed in the art involves periodically increasing the recycle velocity longitudinally through the porous tubes. (See, e.g., U.S. Pat. application Ser. No. 319,066.) Higher recycle rates tend to sweep away accumulated deposits, thus minimizing the build-up of the filter cake within the tubes.

Despite the success of the above-noted cleaning schemes, the cross-flow filtration art continues to search for new techniques for increasing time-averaged filtration fluxes, in order to make cross-flow filtration processes more economical.

The significant increase in time-averaged cross-flow filtration fluxes obtained in accordance with the present invention thus constitutes a significant contribution to the cross-flow filtration art.

SUMMARY OF THE INVENTION

The present invention overcomes the problems and disadvantages of the prior art by providing a method and apparatus for increasing the time-averaged cross-flow filtration flux of solids laden liquids through a filter tube by throttling the flow of filtrate in the product line so as to maintain a constant flux rate at a level below the ordinary start-up flux rate (i.e., at time zero) in the absence of throttling.

Experimental tests which have been conducted, as described in detail below, show that, although the constant flux rate selected is lower than the ordinary start-up flux rate, the fluxes achieved at the end of each test period, and thus the time-averaged flux over the entire filtration run or cycle, i.e. from time zero to the end of the test period, were, nonetheless, higher than those which were achieved in identical or substantially similar cross-flow filtration systems in which the present invention was not utilized.

The degree of flux enhancement obtained in accordance with the present invention depends to varying degrees upon the characteristics of the particular liquid feed being processed, and particularly the chemicals, if any, added as pretreatment, and the characteristics of the suspended solids, as well as various operational parameters of the overall cross-flow filtration process, including the filter tube cleaning techniques utilized, e.g. backflushing, periodically increasing recycle velocity through the tubes, and acid cleaning.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention comprises a method of increasing the time-averaged cross-flow filtration flux of a liquid through a porous filter medium over the period of a filtration run, comprising the steps of: (a) flowing the liquid transversely through the filter medium by establishing a pressure differential across the filter medium; and (b) maintaining the filtration flux rate through the filter medium at a preselected substantially constant value during the entire filtration run by applying a variable throttling pressure on the filtrate side of the filter medium and reducing the throttling pressure during the run to control the instantaneous value of the pressure differential as required to maintain the preselected flux rate, such flux rate being greater than the equilibrium flux rate. Typically, the filter medium comprises a filter tube and the filtrate which is permeated through the filter tube wall is collected in a closed jacket surrounding the filter tube, and the variable throttling pressure is applied to a product line exiting from the jacket.

Broadly, the invention further comprises a method of increasing the time-averaged cross-flow filtration flux of a liquid through a porous filter medium, typically filter tubes, over the period of a filtration run, comprising the steps of flowing the liquid transversely through the filter medium by establishing a pressure differential across the filter medium, and commencing the filtration run by gradually increasing the flow rate of the filtrate from essentially zero to the desired operational flow rate over a sufficiently extended period of time to substantially prevent the intrusion of the particles of material being filtered out of the liquid into the filter medium per se, e.g. the filter tube matrix. Such extended period of time is preferably within the range of from about 15 seconds to about 45 seconds, particularly when utilizing microporous filter tubes.

The invention, in its broadest aspects, also comprises a method of increasing the time-averaged cross-flow filtration flux of a liquid through a porous filter medium over the period of a filtration run, comprising the steps of: (a) flowing the liquid transversely through the filter medium by establishing a pressure differential across the filter medium; and (b) cleaning the surface of the filter medium prior to commencement of the filtration run by flowing a cleaning solution, typically including an acid such as, for example, hydrochloric acid, laterally over the surface of the filter medium while simultaneously temporarily eliminating the pressure differential across the filter medium.

As broadly contemplated, the invention further comprises the combination of any one or more of the above-described methods, either alone or in further combination with conventional flux enhancement techniques such as, for example, back flushing and periodically increasing recycle velocity.

Moreover, the present invention broadly contemplates apparatus for practicing the above-described methods.

The accompanying drawings, which are incorporated in and constitute a part of this specification, illustrate various features of the invention and, together with the description, serve to explain the principles of the invention.

DETAILED DESCRIPTION OF THE PREFERRED EMBODIMENTS

Reference will now be made in detail to the presently preferred embodiments of the invention, examples of which are illustrated in the accompanying drawings.

Cross-flow filtration in accordance with the invention may be accomplished, for example, using thick-walled, microporous thermoplastic tubes. These tubes can be made from a wide variety of extrudable thermoplastics, such as, for example, nylon or polyethylene, and typically have walls of about one millimeter in thickness. Although subject to variation, such tubes may, for example, possess a dominant pore size on the order of about one to ten microns and a porosity on the order of about 65% i.e., the pores cover 65% of the surface area of the tubes. The preferred, although certainly not the only, porous thermoplastic tubes useful in practicing the present invention are the previously mentioned HYDROPERM TM tubes having the characteristics referred to above, which tubes are presently commercially available from Neptune Microfloc, Inc., of Corvallis, Oreg.

Figure 1:
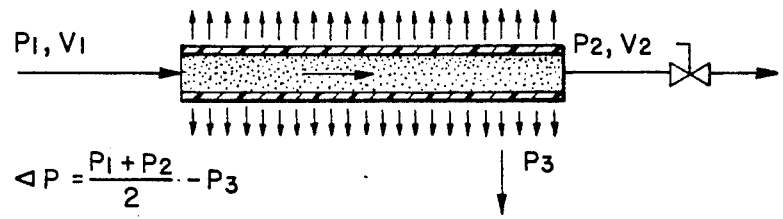
FIG. 1 is a schematic, sectional view of a cross-flow micro-filtration tube, showing the direction of feed flow (circulation) and the direction of filtrate flow (permeation)

A schematic view of cross-flow filtration through such a thick-walled, microporous thermoplastic tube is shown in FIG. 1. A liquid feed flows through the inside of the tube at relatively low pressures, e.g., 2 to 50 psi, and filtrate permeation occurs through the tube wall, which is relatively thick, e.g. on the order of about one millimeter.

During the initial stages of microfiltration, a majority of the suspended solids in the feed is deposited onto the wall as the dynamic membrane (sludge layer). The growth of this dynamic membrane is limited by the shear forces acting on it due to the circulation velocity of the liquid flowing lengthwise along the tube. This shearing action takes the form of erosion. The balance of the deposition rate and the erosion rate of the dynamic membrane establishes an equilibrium sludge layer thickness, and therefore the equilibrium (plateau) fluxes, for the feed being filtered. This balancing condition is critically dependent on the characteristics of the suspended solids in the feed liquid. Two types of suspended solids can be categorized as limiting cases, namely, those which are cohesionless and those which are cohesive. For cohesive solids, the bonding stress between particles is relatively large, so that once they are brought into contact, higher shearing force is required to break their bond. In other words, this type of solid requires a relatively strong erosion effect. On the other hand, cohesionless solids have weak bonds with respect to each other and are therefore much more easily eroded. Even in the case of a cohesionless solid, however, binding to the interior wall of the filter tube may occur, thus producing a thin, adhering layer immediately adjacent to the wall, which will require a strong erosion effect in order to remove it.

Other parameters that govern solids behavior are the effective solid particle diameter and the particle size distribution in the feed. The characteristics of the feed liquid itself, such as pH, viscosity, etc., may also show some influence on the behavior of the suspended solids in the feed. Chemical additives are commonly used in wastewater treatment, and their addition to the wastewater will also change the characteristics of the suspended solids, and thus will vary the flux rate.

Since it is desirable to render the dynamic membrane on the filter tube wall cohesionless, chemical pretreatment of the feed prior to cross-flow filtration may prove advantageous in practicing the invention in conjunction with the filtration of many liquids, In general, the objective of such pretreatment should be to obtain a feed comprising a fluffy or loose type, cohesionless floc. Examples of typical conventional pretreatment additives suitable for use in the present invention include, without limitation, conventional flocculants (e.g., calcium hydroxide, alum, calcium sulfate, ferric hydroxide, etc.), polyelectrolyte flocculants, and additives such as those disclosed in U.S. Pat. No. 4,313,830.

Figure 2:
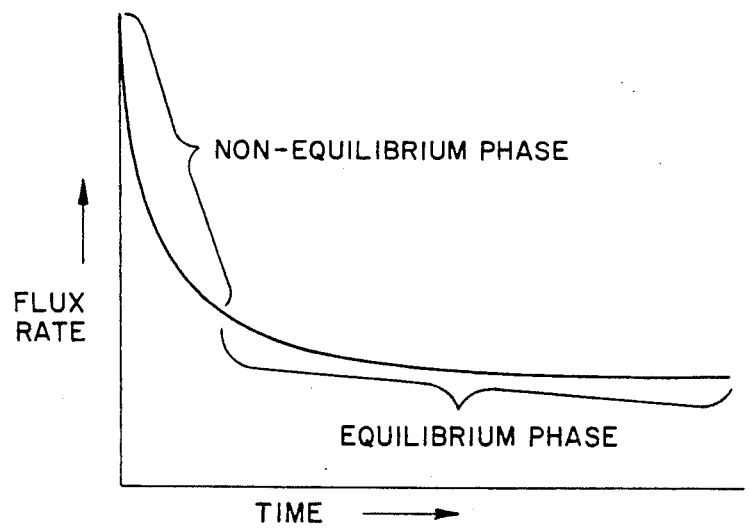
FIG. 2 is a graph showing a typical flux rate vs. time curve for conventional cross-flow filtration devices.

As previously noted, conventional cross-flow filtration devices, including microfilters, ultrafilters and reverse osmosis units, experience a decline in flux rate during filtration runs until an equilibrium (plateau) flux rate is attained. Typically, such conventional devices exhibit a flux rate vs. time curve similar to that shown in FIG. 2. As shown in FIG. 2, such a curve comprises two distinct phases, namely (1) a non-equilibrium phase immediately following start-up (time zero) and characterized by high, but rapidly declining, flux rates, and (2) an equilibrium phase following the non-equilibrium phase and characterized by lower flux rates which decline much more slowly with time. The non-equilibrium phase usually extends over the first several hours of a filtration.

Flux rates (F) observed during the non-equilibrium phase of such flux/time curves are proportional to the feed velocity (V), the pressure differential ($\Delta P$) and time (t) according to the following general relationship:

$$F \alpha V^a \cdot \Delta P^b \cdot t^{-c}$$

The aforementioned parameters are defined in FIG. 1.

In contrast, the flux rates observed during the equilibrium phase (i.e., plateau fluxes) of such flux/time curves are proportional essentially only to feed velocity.

Although there are many ramifications associated with operation of cross-flow filtration systems in the non-equilibrium phase, one distinctive characteristic is that non-equilibrium flux rates (i.e., fluxes in the non-equilibrium phase) are higher than equilibrium flux rates (i.e., fluxes in the equilibrium phase). While it would thus be highly desirable to operate cross-flow filtration systems in a non-equilibrium mode, the extremely rapid (approximately exponential) flux decline associated with the non-equilibrium phase has, to date, made this totally impractical. That is, the high flux rates associated with the non-equilibrium phase exist for too short a period of time to be of practical value.

We have found, however, that operation of cross-flow filtration systems in a non-equilibrium mode for extended periods of time is possible, while maintaining flux rates in excess of conventional equilibrium (plateau) flux rates. This is made possible by the relatively simple expedient of product (i.e., filtrate) line throttling. Specifically, we have found that when the flow rate of the filtered product is throttled so as to maintain a constant flux rate below the ordinary initial flux rate (i.e., the flux rate at the beginning of a new filtration run, immediately after tube cleaning and in the absence of any throttling; also referred to herein as the "zero time" or "clean" flux rate), it is possible to maintain a steady flux rate higher than the equilibrium plateau) flux rate for relatively long periods of time, e.g. runs lasting hours to days. In this mode of operation, the pressure differential ($\Delta P$) increases with time throughout the run as required to maintain the selected constant flux rate.

The advantages of product throttling in cross-flow filtration systems include: (1) the ability to maintain flux rates at higher than equilibrium (plateau) values; (2) reduction of the compressive forces acting on the dynamic membrane formed on the interior tube surface (such forces lead to reduced flux rates and possible tube matrix plugging); (3) reduction of the rate of deposition (i.e., growth) of the dynamic membrane; and (4) the ability to maintain a constant flow rate to downstream equipment requiring same, e.g., reverse osmosis units.

Figure 3:
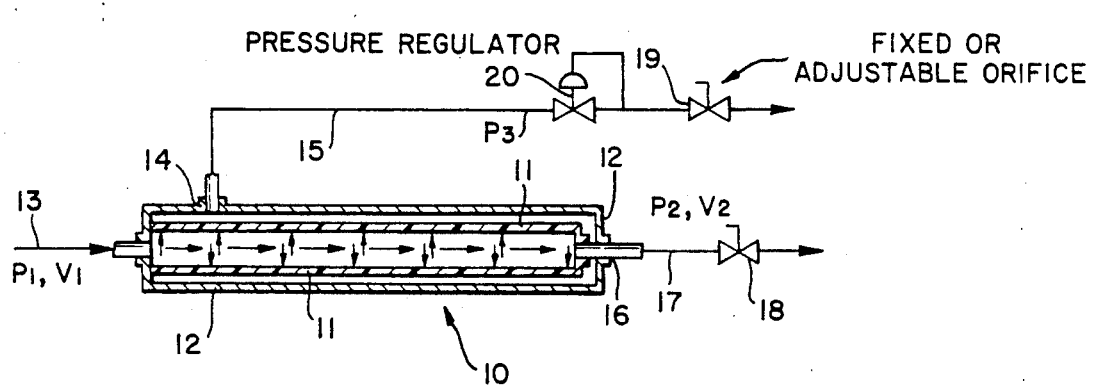
FIG. 3 is a schematic flow diagram illustrating one embodiment of a filtration tube module in accordance with the present invention utilizing product line throttling.

FIG. 3 is a schematic flow diagram, in partial cross section, showing a simplified embodiment of a filtration tube module constructed in accordance with the present invention utilizing product line throttling. The suspended solids (and/or emulsified oil) laden liquid to be filtered flows through a filter tube module 10 in the direction shown by the arrows. As shown, tube module 10 includes a single microporous filter tube 11 (e.g., a HYDROPERM ™ tube) encased within a closed filtrate collection jacket 12. Preferably, commercial scale tube modules 10 will include a plurality (as many as hundreds) of filter tubes 11 arranged in a parallel tube bundle (not shown) within a single jacket 12. A conventional inlet (circulation) pump (not shown) provides the requisite inlet pressure ($P_1$) and liquid flow velocity ($V_1$) in feed line 13.

A portion of the liquid is permeated transversely through the wall of filter tube 11 in the direction shown by the arrows, thereby depositing at least a portion of the solids/emulsified oil on the inner surface of tube 11 as a dynamic membrane (not shown), as discussed previously. The liquid permeated through filter tube 11 (i.e. the filtrate) is collected in closed jacket 12 surrounding filter tube 11, and the collected liquid is removed from jacket 12 via a port 14 extending through the jacket and connected to product (filtrate) line 15. The filtrate exit pressure in product line 15, designated ($P_3$), is essentially zero in conventional cross-flow filtration systems.

The portion of the liquid which is not permeated through the wall of filter tube 11 exits from module 10 via port 16 in jacket 12 and via exit line 17 connected thereto at a velocity designated $V_2$ and at an exit pressure designated $P_2$, as shown. A conventional back pressure valve 18 situated in exit line 17 establishes a net positive pressure in filter tube 11, as known in the art.

In accordance with one embodiment of the present invention, product line throttling is achieved by placing a flow controller e.g. a Griswald flow controller—not shown) or a pressure regulator 20 and valve 19 in tandem in product line 15, as shown, and by partially closing valve 19. Product line throttling is used to maintain a constant flux rate over the entire length of a filtration run by continually increasing the pressure differential $$\left( \text{i.e., } \Delta P = \frac{P_1 + P_2}{2} - P_3 = \text{the driving pressure} \right)$$

throughout the run. The pressure differential is increased by reducing the value of $P_3$ by reducing the throttling pressure applied to product line 15 (using valve 19 and pressure regulator 20).

By way of hypothetical example, if the filter tube inlet pressure $P_1$ is initially 30 psi, the initial product line pressure $P_3$ in conventional cross-flow filtration devices is 0 psi, so that the initial pressure differential $\Delta P$ (driving pressure) is approximately 30 psi. In such conventional devices, the pressure differential remains substantially constant over time, so that the pressure differential at the end of the filtration run will continue to be on the order of 30 psi. As noted previously, during the course of conventional filtration runs, the flux rate will decline rapidly until the plateau flux is reached.

In contrast to such conventional devices, the present invention provides flux enhancement by throttling the product line pressure $P_3$, using pressure regulator 20 and valve 19. Referring to the above-mentioned hypothetical example, if the filter tube inlet pressure $P_1$ is 30 psi at the start up of the filtration run, the initial product line pressure $P_3$ in the present invention will be throttled so as to provide the initial pressure differential required to provide the desired constant flux rate at start up. For example, $P_3$ might be throttled to 20 psi initially, thus producing an initial pressure differential of 5 psi. The flux rate is selected based on practical economic factors presented by the particular filtration application of concern; but in every case it will be higher than the plateau flux reached if product throttling were not employed. Thus, despite the fact that the initial flux rate is lower in the present invention, because of product line throttling, the time-averaged flux rate over the entire run will be higher than that of conventional systems.

As the filtration run progresses, the product line (throttling) pressure $P_3$ is continually reduced, thus increasing the pressure differential ($\Delta P$) in order to maintain the flux rate at the desired constant value. Eventually, as the run continues, the driving pressure $\Delta P$ will increase to the value of the average of the inlet pressure $P_1$ and the outlet pressure $P_2$, with $P_3$ being reduced to zero at the end of the filtration run. At this point, the system will resemble a conventional system, and flux decline to the equilibrium (plateau) flux rate will occur. Thus, the selection of the values for the initial inlet pressure $P_1$, the initial product line pressure $P_3$ (i.e., the throttling pressure initially applied), and the constant flux rate will depend on such practical factors as the desired length of the filtration run (i.e., the number of hours the filtration device must routinely operate before it can be shut down for cleaning), the volume of liquid to be filtered during such runs, and the cost of the equipment required to generate the inlet and throttling pressures.

Preferably, for tubular microfiltration systems constructed in accordance with the present invention, the value of the initial inlet pressure $P_1$ will be within the range of from about 25 to about 40 psi, the value of the initial product line (throttling) pressure $P_3$ will be within the range of from about 20 to about 35 psi, the lower limit of $\Delta P$ (pressure differential) will be within the range of from about 2 to about 6 psi, still more preferably on the order of about 5 psi, and the upper limit of ΔP will be about 40 psi.

In accordance with the invention, product line throttling, as described above, is preferably practiced in combination with another novel flux enhancement technique which we have discovered, namely, slow start up of the liquid flow transversely through the filter medium at the beginning of the filtration run.

Specifically, the method of the present invention preferably further comprises the step of commencing the filtration run by gradually increasing the flow rate of the filtrate from essentially zero (at start up) to the desired operational flow rate over a sufficiently extended period of time to substantially prevent deleterious intrusion of the particles of material being filtered out of the liquid into the filter tube matrix. As will be discussed in greater detail below, we have found that such extended period of time is preferably within the range of from about 15 seconds to about 60 seconds, and still more preferably, from about 30 seconds to about 45 seconds. Such slow start up of the liquid flow through the filter medium yields longer filtration runs (lower pressure differentials ΔP) both when accompanying product line throttling according to the present invention and when practiced alone.

Preferably, such slow start up is accomplished by beginning the filtration run with product line throttling valve 19 (FIG. 3) fully closed, and then gradually (and preferably steadily) opening valve 19 slowly over the time periods noted above.

In accordance with the invention, product line throttling and/or slow start up, as described above, are preferably practiced in combination with yet another novel flux enhancement technique which we have discovered, namely, product port closure during cleaning.

Specifically, the method of the present invention preferably further comprises the step of cleaning the surface of the filter medium prior to commencement of the filtration run by flowing a cleaning solution laterally over the surface of the filter medium while simultaneously temporarily eliminating the pressure differential ΔP across the filter medium, preferably by blocking all flow from jacket 12 (FIG. 3), e.g., by closing product port 14 (using, for example, a conventional valve, not shown) or by fully closing valve 19 in product line 15. For example, the cleaning solution may contain hydrochloric acid.

We have found that cleaning HYDROPERM ™ microporous filter tubes with an acid-containing cleaning solution while keeping product port 14 (FIG. 3) of collection jacket 12 open produces flux rates which, although initially quite high, decline rapidly (approximately exponentially) with time to unacceptably low levels. By closing product port 14 during acid cleaning, considerably lower pressure differentials can be achieved, thus leading to enhanced flux rates. This technique may be practiced alone or in combination with product line throttling and/or slow start up, as described previously.

All of the above-described flux enhancement techniques of the present invention, either individually or in combination, are preferably practiced together with some conventional form of physical cleaning of the filter medium. For example, it is preferable to practice product line throttling, slow start up, and/or product port closure in combination with such known physical cleaning techniques as periodic backflushing or periodically increasing recycle (circulation) velocity.

Specifically, the method of the present invention preferably further comprises periodically backflushing a liquid (preferably including the filtrate from filtration) transversely through the filter medium by reversing the direction of the pressure differential. The duration of each such backflushing pulse is preferably about 2 seconds, and the interval between backflushings is preferably within the range of from about 1 minute to about 2 minutes. The backflushing pressure is preferably on the order of about 50 psi.

As an alternative to backflushing, particularly in conjunction with microfiltration, the method of the present invention also preferably further comprises periodically increasing the recycle velocity of the liquid flowing laterally along the surface of the filter medium, with the duration of each such periodic increase being within the range of from about 5 to about 60 seconds, and the interval between such periodic velocity increases not exceeding about 20 minutes. The recycle velocity is preferably increased to a value within the range of from about 10 to about 20 ft. per sec., using techniques such as those disclosed in U.S. Pat. application Ser. No. 319,066.

Figure 4:
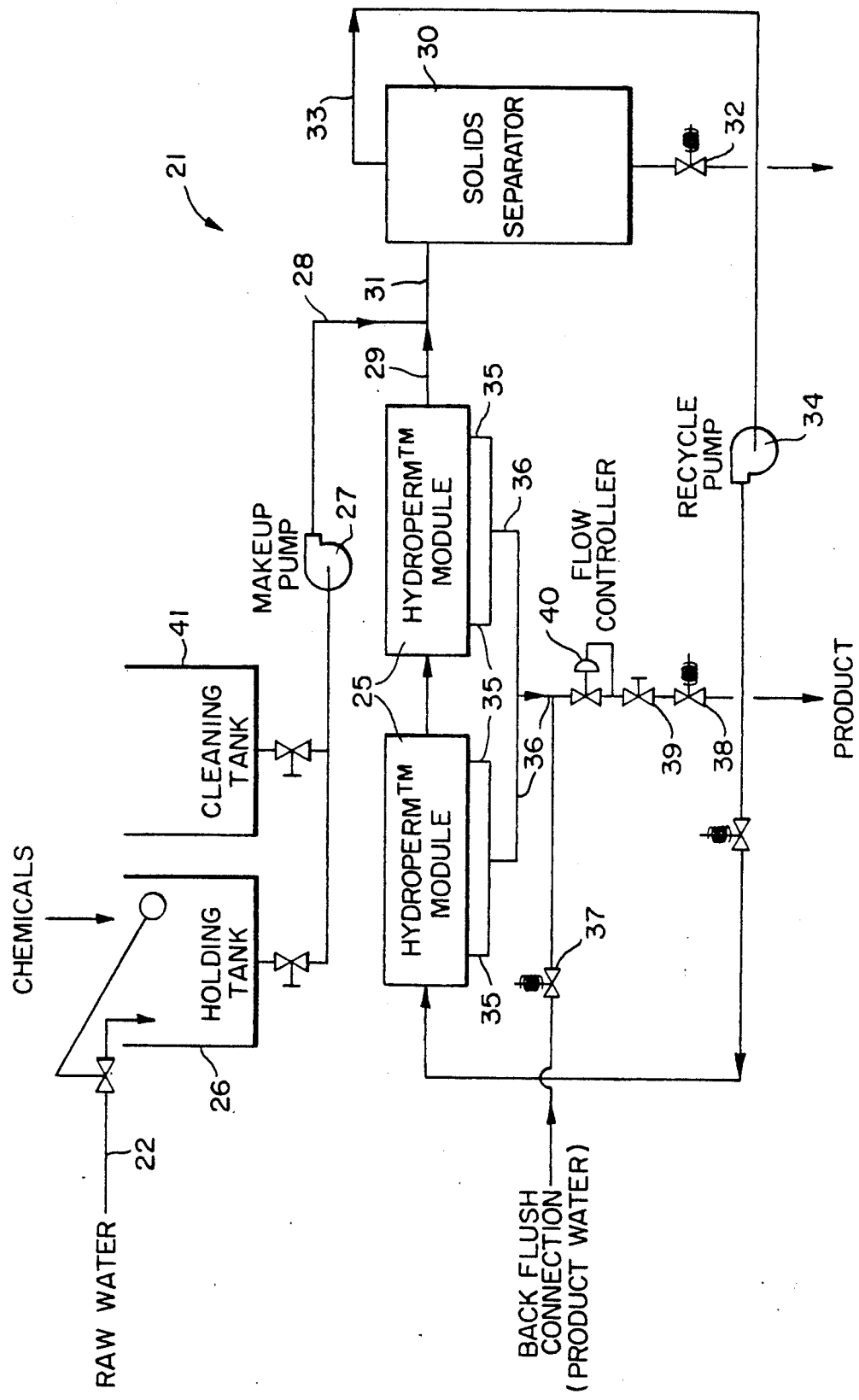
FIG. 4 is a schematic flow diagram illustrating a further embodiment of the present invention showing additional process details.

Cross-flow filtration tests were made with a pilot-sized unit 21 that contained two identical 4 foot long pilot filtration modules 25 arranged in series, each with a 2.78 ft$^2$ of HYDROPERM ™ tube area (see FIG. 4). Water from a small plastic holding tank 26 was pumped into the system at about 25 psig by a conventional makeup pump 27. The makeup stream 28 was mixed with a recycle stream 29 from the second module 25 before entering a conventional solids classifier/separator 30. Suspended solids contained in the combined stream 31 were partially removed by centrifugal force and periodically blown-down from the bottom of the separator via valve 32. Water exiting the top of the separator via line 33 was pressurized further with a conventional centrifugal recycle pump 34 to an average inlet pressure of 28 psig before entering the lead module 25, as shown by the arrows. Filtration occurred through the HYDROPERM ™ tube walls (not shown) and filtrate was collected on the shell side of each module 25 and exited from the modules via exit ports 35 fluidly connected to product line 36. The exit velocity was 5 ft. per sec.

All tests were conducted with an artificial impurity, namely, an average of 50 mg/L commercial grade ferric sulfate, added to tap water 22 in the holding tank 26. The ferric sulfate immediately hydrolyzed to form a suspension of ferric hydroxide that served as filterable material for the experiments. Such filterable material was selected because it is similar to metal plating waste.

Backflushing was accomplished once per minute by opening valves 37 and 32 for 2 seconds and closing product line valve 38 for the same period of time, using product water as the back-flushing liquid and a driving pressure of 45 psig, in the manner discussed previously.

Product line throttling was accomplished by partial closure of valve 39 and by the operation of pressure regulator 40 in the manner discussed previously.

Cleaning was performed after each experiment (i.e., at the end of each filtration run) by recycling a 1 percent acid solution containing hydrochloric acid through the modules 25 from cleaning tank 41.

Figure 6:
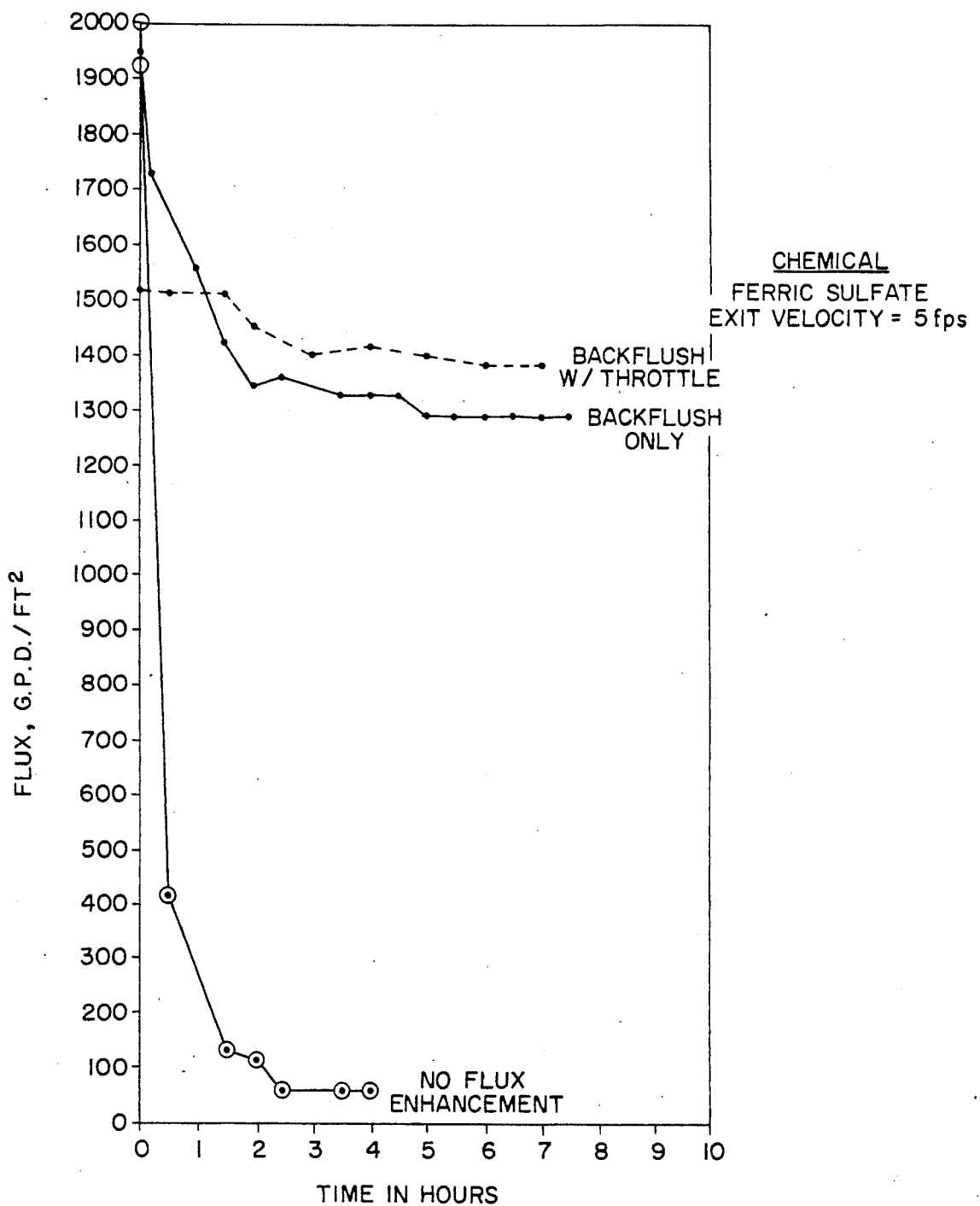
FIGS. 6-10 are graphs showing experimental data from the examples discussed below.

FIG. 6 is a graph showing the test results.

As can be seen from FIG. 6, with no flux enhancement, the non-equilibrium portion of the filter run began at 1942 gallons per day per square feet of active filter medium surface (gpd/ft$^2$) and ended after 2.5 hours, stabilized at a flux rate of 50 gdp/ft$^2$.

With backflushing alone, an equilibrium flux of 1295 gpd/ft was observed. Using backflushing combined with product line throttling, a flux rate of 1372 gpd/ft$^2$ was achieved, for an increase of 6.2%. (The reason the throttled value tailed off with time is thought to be because there was not sufficient product water pressure for the flow controller 40 to operate properly, i.e. pressure regulator required 10 psi upstream, and for most of the filtration run our system provided a product line pressure of less than 10 psi.) It should be noted that different absolute values of flux rate will be obtained using different backflushing frequencies and durations.

That flux enhancement was achieved with product line throttling was completely unexpected and contrary to prior art teachings. Indeed, manufacturers of conventional cross-flow filters make every effort to insure that product line throttling does not occur. It is reasoned in the art that throttling will decrease the flux, which of course it does, but only at the beginning of the run. What has not been realized in the art is that over the entire course of a filtration run (filter cycle), the time-averaged flux rate will actually be enhanced by throttling. We believe that the reason this occurs is that throttling maintains the non-equilibrium portion of the filtration run by metering out the pressure differential (driving pressure) only as needed to maintain a constant flux rate. The solids deposition rate is greatly reduced, as are the compressive forces acting on the dynamic membrane.

Figure 5:
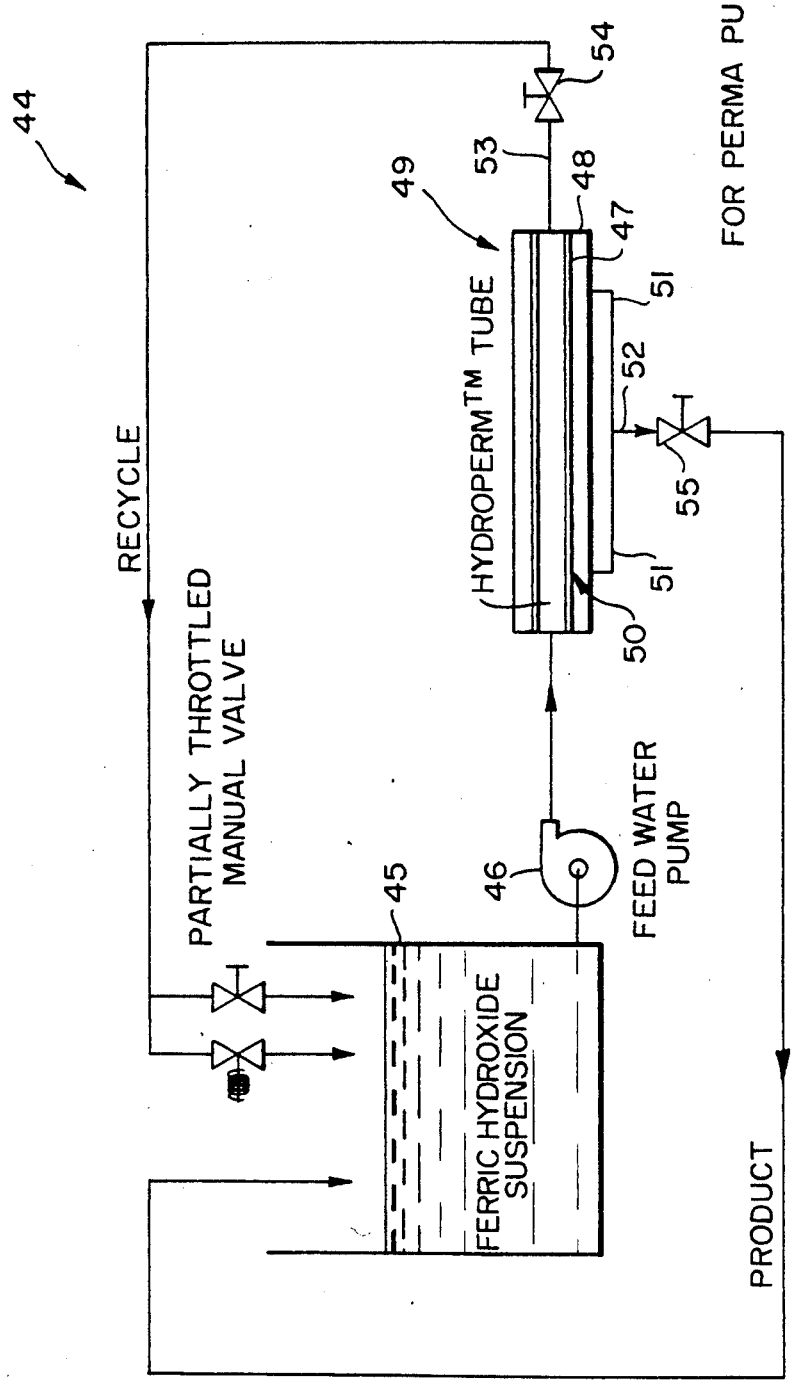
FIG. 5 is a schematic flow diagram showing a single cross-flow filtration tube test apparatus suitable for practicing the present invention.

Several sets of additional experiments were conducted using the single tube test apparatus 44 illustrated in FIG. 5.

Water from a small plastic recycle tank 45 was pumped at about 20 psig by a conventional feed pump 46 to a single 6 mm inner diameter, 3 foot long HYDROPERM TM tube 47 encased in a filtrate collection jacket 48 to form a module 49. Filtrate was removed on the shell side 50 of the module 49, and exited from the module via exit ports 51 in jacket 48 fluidly connected to product line 52. The remaining recycle flow 53 was piped back to holding tank 45. For test purposes, product water (i.e., filtrate) was also added back to holding tank 45 to provide a closed loop system.

Unless otherwise noted, the tests were conducted with 50 mg/L of commercial grade ferric sulfate and 0.2 mg/L of a catonic polymer (Allied ® 776) added to tap water in holding tank 45. The ferric sulfate immediately hydrolyzed to form a suspension of ferric hydroxide that served as filterable material for the experiments. The polymer was added to improve the rheological quality of the solids.

Physical cleaning by periodically increasing recycle velocity (referred to hereinafter as "Perma Pulse") was evaluated by periodically increasing the recycle flow 53 by opening conventional valve 54. The recycle velocity varied from 4.4 ft. per sec. during filtration to 12.5 ft. per sec. during the Perma Pulse mode of operation. For these tests, the frequency between increases in recycle velocity was set at 2 minutes and the duration of each pulse was 15 seconds.

Slow startup tests were conducted by slowly and steadily opening valve 55 following cleaning, as described below.

The effects of product port closure vs. opening during cleaning were investigated by closing or opening valve 55 during the cleaning cycle.

Cleaning was performed before beginning each filtration run (e.g., after each experiment) by recycling an acid-containing cleaning solution through the filtration loop. (Clean flux was confirmed prior to each experiment by flowing deionized water through the module.)

Figure 7:
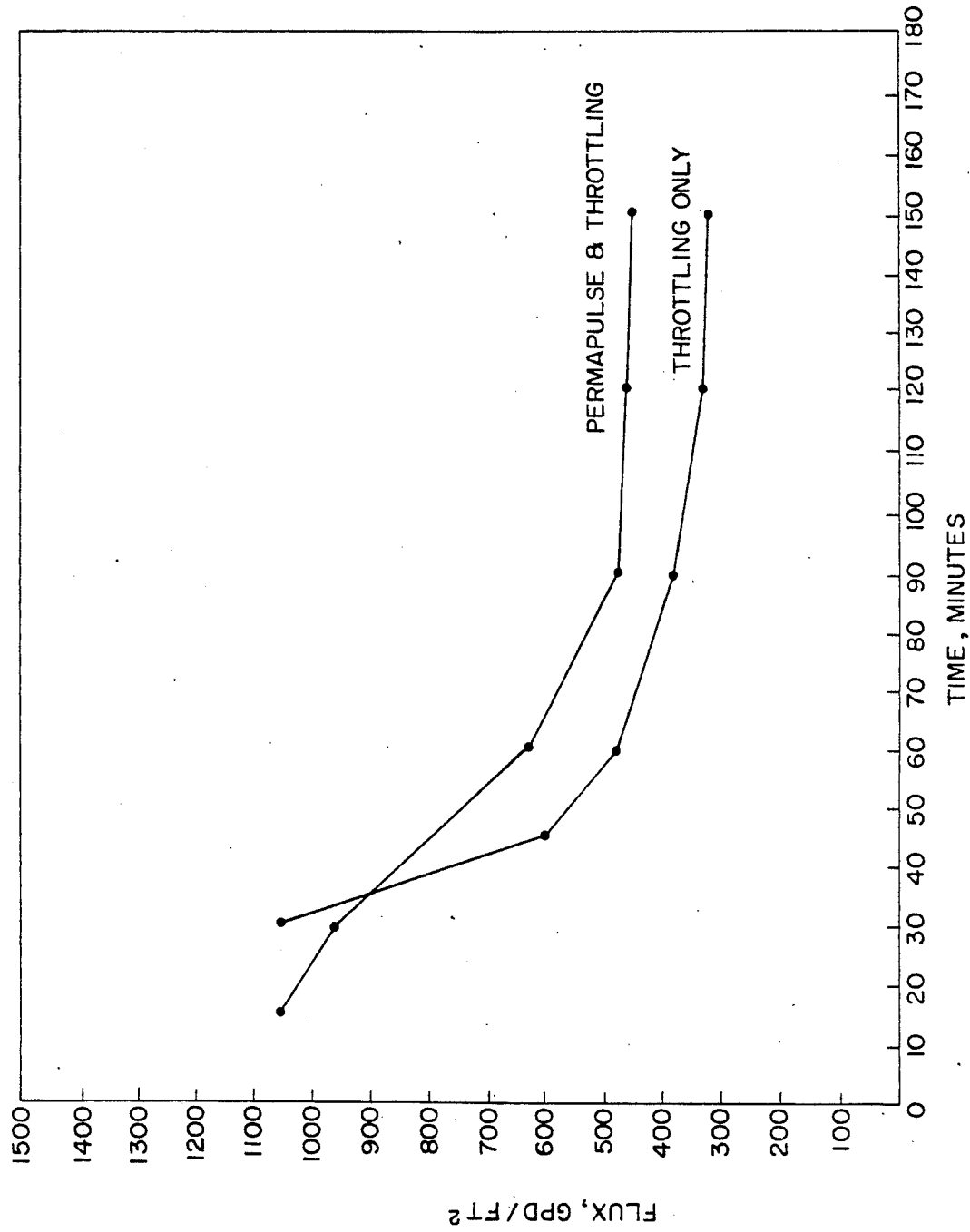

The results of one set of experiments are plotted in FIG. 7. These experiments contrasted Perma Pulse combined with product line throttling to product line throttling only. Product line throttling was accomplished to limit the flux rate to 1050 gpd/sq. ft. of active filter tube area. With product line throttling only, flux began to drop below the set point after about 30 minutes. Perma Pulse coupled with product throttling was slightly more effective than throttling alone.

Figure 8:
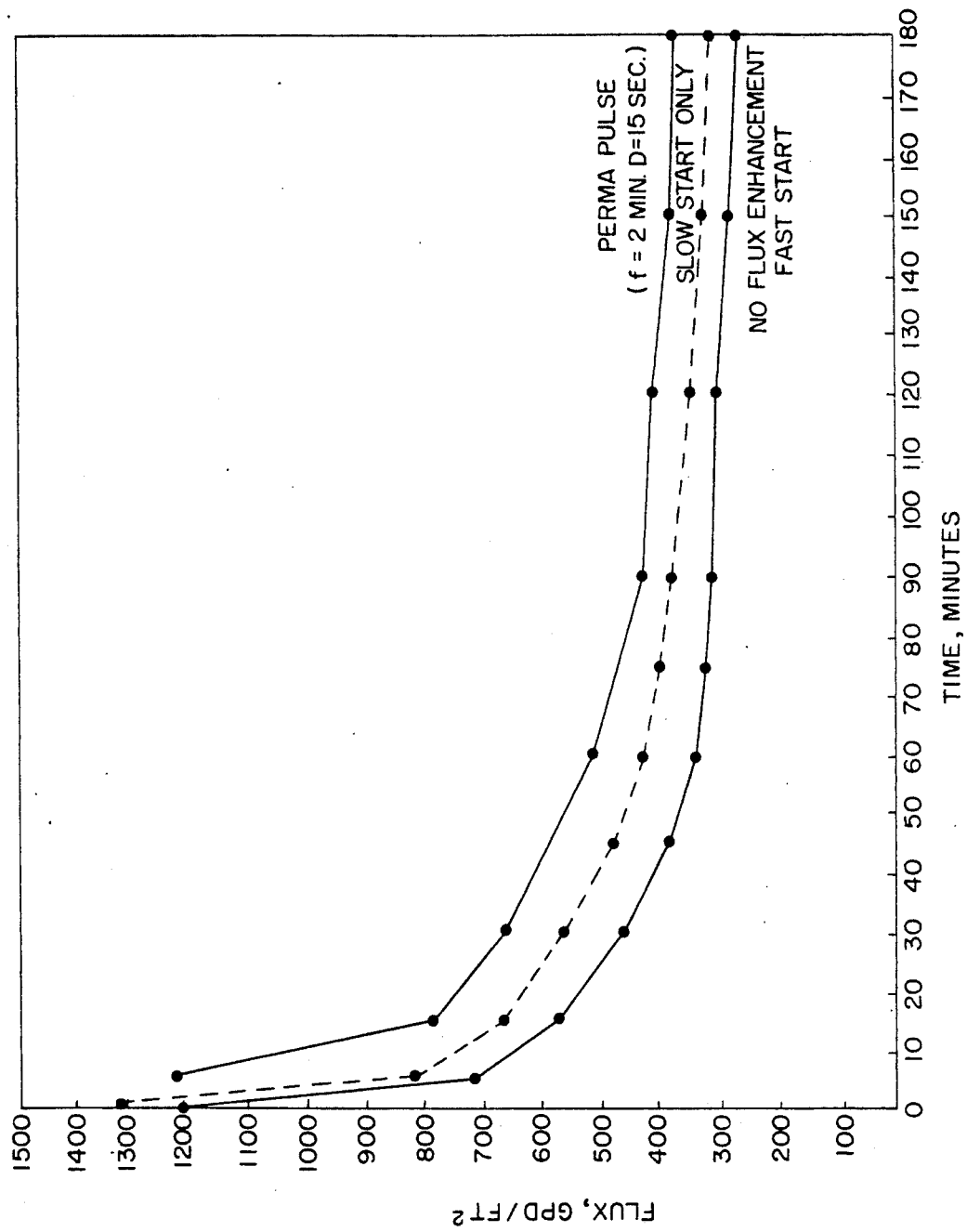

The results of a further set of experiments using the FIG. 5 test apparatus are plotted in FIG. 8. In these tests, a Perma Pulse plus slow startup run and a slow startup only run were contrasted to a run made with no flux enhancement procedures whatsoever. The Perma Pulse experiments were conducted in the slow startup mode, as described herein, in which product line 52 was steadily opened over a 1 minute period using valve 55. Perma Pulse frequency was 2 minutes with a duration of 15 seconds. Fluxes from all runs were seen to decline to an equilibrium value in about 90 minutes. The equilibrium flux for Perma Pulse plus slow startup was about 30 percent greater than that observed in the non-flux enhanced run. Perma Pluse equilibrium flux was about 17 percent higher than the equilibrium value of the run that incorporated slow startup only.

Figure 9:
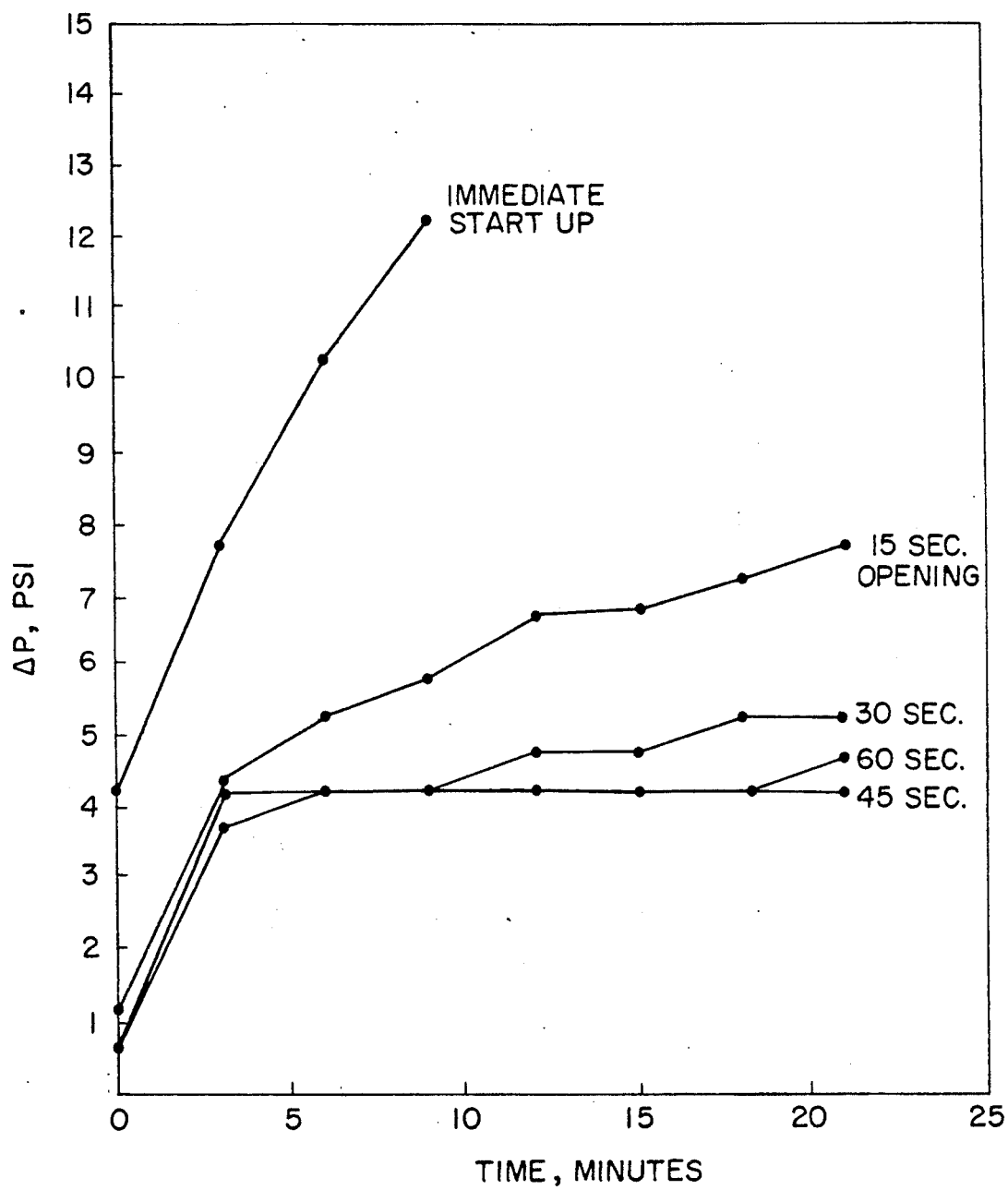

FIG. 9 is a graph plotting pressure differential ($\Delta P$) vs. time, showing the results of another set of experiments conducted using the FIG. 5 test apparatus. These tests investigated slow startup by gradually opening product line valve 55 over different periods of time. The flux rate was held constant by product line throttling, as described herein. As can be seen, the beneficial effects of slow startup, in terms of a lower driving pressure ($\Delta P$), are achieved for startup periods ranging from about 15 seconds to about 45 seconds, with gradual steady opening of product line valve 55 over a period of 45 seconds showing the best results. These tests were conducted with sea water plus 50 ppm aluminum sulfate as the filterable material, and utilized backflushing (as described previously) at a frequency of 60 seconds with a duration of 2 seconds (backflushing pump not shown).

As previously discussed, we have further discovered a surprising effect resulting from leaving the product port 51, or product line valve 55, closed during acid cleaning of the filtration tubes. We have found that when product port 51 is open during cleaning, the initial (time zero) pressure differential is much higher than the starting $\Delta P$ obtained with the product port closed. Pressure differential also increases at a faster rate with time when product port 51 is left open during cleaning. Without this flux enhancement procedure, we have frequently found that the limiting pressure differential ($\Delta P$) is reached in only 3 to 4 hours (at a constant flux rate). This compares with 12 or more hours typically achieved with this particular flux enhancement procedure of the invention.

Figure 10:
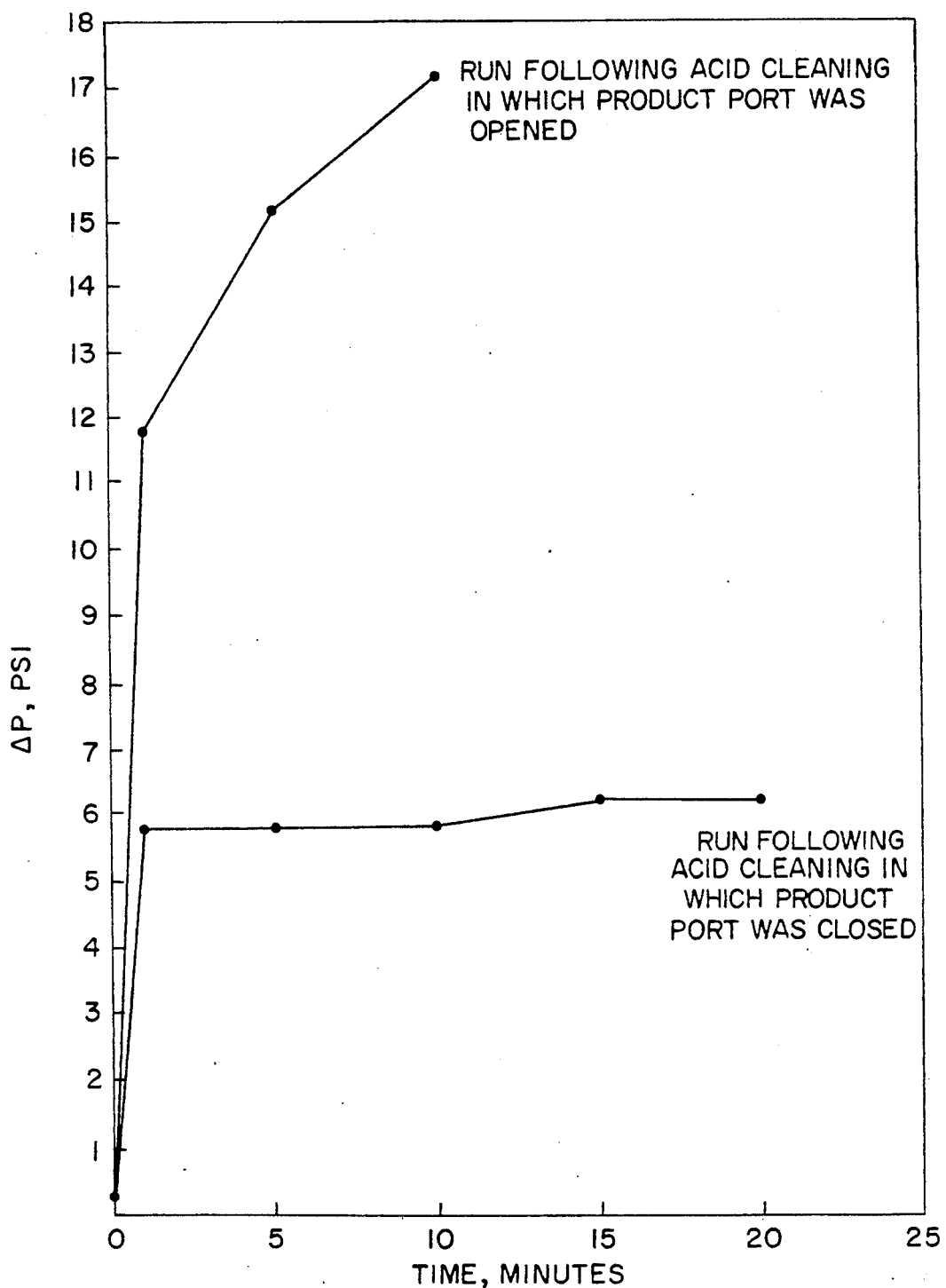

FIG. 10 is a graph plotting pressure differential ($\Delta P$) vs. time, showing the results of an additional set of experiments conducted using the FIG. 5 test apparatus. These tests compared a filtration run following acid cleaning during which product line valve 55 was opened with a filtration run following acid cleaning during which product line valve 55 was closed. The beneficial results of product port closure during acid cleaning can be readily seen, in terms of the lower driving pressure (ΔP) experienced. The test conditions were essentially identical to those described above in connection with FIG. 9, including the use of backflushing.

For cross-flow filters to work most efficiently, a certain minimum suspended solids concentration must be present. Below this minimum, individual pores of the tube are blocked by individual particles (blocking filtration). This results in rapid flux declines. Above this minimum, particles become self-supporting and form a filter cake over the pores of the tube. In cake filtration, the tube matrix does not become blocked. This is the desired filtration mechanism, since resistance is minimal through a cake and maximum through a partially blocked tube matrix. This is the theory that underlies product port closure during cleaning in accordance with the present invention. Cleaning solution dissolves the bulk of the solids in the recirculating stream and may result in a solids concentration below that required for the initiation of cake filtration. If the product port is open and acid flows through the tube walls, matrix plugging can occur.

It will be apparent to those of ordinary skill in the art that various modifications and variations can be made to the above-described embodiments of the invention without departing from the scope of the appended claims and their equivalents. As an example, the invention can have application to cross-flow filtration systems other than microfiltration, such as, for example, ultrafiltration and reverse osmosis systems. Thus, it is intended that the present invention cover the modifications and variations of this invention, provided they come within the scope of the appended claims and their equivalents.

What is claimed is:

1. A method of increasing the time-averaged cross-flow filtration flux of a liquid through a porous microfiltration filter medium over the period of a filtration run, comprising the steps of:
   a) flowing the liquid transversely through the microfiltration filter medium by establishing a pressure differential across the microfiltration filter medium; and
   b) maintaining the filtration flux rate through the microfiltration filter medium at a preselected substantially constant value during the entire filtration run by applying a variable throttling pressure on the filtrate side of the microfiltration filter medium and reducing said throttling pressure during the run to control the instantaneous value of said pressure differential as required to maintain said preselected flux rate, said flux rate being greater than the equilibrium flux rate.

2. A method as claimed in claim 1, wherein the microfiltration filter medium comprises at least one microfiltration filter tube and the filtrate which is permeated through the microfiltration filter tube wall is collected in a closed jacket surrounding said microfiltration filter tube, and wherein said variable throttling pressure is applied to a product line exiting from said jacket.

3. A method as claimed in claim 1 or 2, further comprising the step of commencing the filtration run by gradually increasing the flow rate of the filtrate from essentially zero to the desired operational flow rate over a sufficiently extended period of time to substantially prevent the deleterious intrusion of the particles of material filtered out of the liquid into the microfiltration filter medium per se.

4. A method as claimed in claim 3, wherein said extended period of time is within the range of from about 15 seconds to about 45 seconds.

5. A method as claimed in claim 1, further comprising the step of cleaning the surface of the microfiltration filter medium prior to commencement of the filtration run by flowing a cleaning solution laterally over said surface while simultaneously temporarily eliminating said pressure differential across the microfiltration filter medium to prevent particles from lodging in the microfiltration filter medium during cleaning and thereafter.

6. A method as claimed in claim 2, further comprising the step of cleaning the interior surface of the microfiltration filter tube prior to commencement of the filtration run by flowing a cleaning solution laterally over said surface while simultaneously temporarily eliminating said pressure differential across the microfiltration filter medium by blocking all flow from said jacket to prevent particles from lodging in the microfiltration filter medium during cleaning and thereafter.

7. A method as claimed in claim 5 or 6, wherein said cleaning solution includes an acid.

8. A method as claimed in claim 5, further comprising the step of cleaning the surface of the microfiltration filter medium prior to commencement of the filtration run by flowing a cleaning solution laterally over said surface while simultaneously temporarily eliminating said pressure differential across the microfiltration filter medium to prevent particles from lodging in the microfiltration filter medium during cleaning and thereafter.

9. A method of increasing the time-averaged cross-flow filtration flux of a liquid through a porous microfiltration filter medium over the period of a filtration run, comprising the steps of:
   a) flowing the liquid transversely through the microfiltration filter medium by establishing a pressure differential across the microfiltration filter medium; and
   b) commencing the filtration run by gradually increasing the flow rate of the filtrate from essentially zero to the desired operational flow rate over a sufficiently extended period of time to substantially prevent the intrusion of the particles of material being filtered out of the liquid into the microfiltration filter medium per se.

10. A method as claimed in claim 9, wherein said extended period of time is within the range of from about 15 seconds to about 45 seconds.

11. A method of increasing the time-averaged cross-flow filtration flux of a liquid through a porous microfiltration filter medium over the period of a filtration run, comprising the steps of:
   a) flowing the liquid transversely through the microfiltration filter medium by establishing a pressure differential across the microfiltration filter medium;
   b) cleaning the surface of the microfiltration filter medium prior to commencement of the filtration run by flowing a cleaning solution laterally over said surface while simultaneously temporarily eliminating said pressure differential across the microfiltration filter medium; and
   c) commencing the filtration run by gradually increasing the flow rate of the filtrate from essentially extended period of time to substantially prevent the intrusion of the particles of material being filtered out of the liquid into the microfiltration filter medium per se.

12. A method as claimed in claim 11, wherein said extended period of time is within the range of from about 15 seconds to about 45 seconds.

13. A method as claimed in claim 1, 9 or 11, further comprising the step of periodically backflushing a liquid transversely through the microfiltration filter medium by reversing the direction of said pressure differential, thereby physically cleaning the microfiltration filter medium.

14. A method as claimed in claim 13, wherein said backflushed liquid includes said filtrate and the duration of each backflushing period is about 2 seconds and the interval between backflushings is within the range of about 1 minute to about 2 minutes.

15. A method as claimed in claim 1, 9 or 11, further comprising the step of periodically increasing the circulation velocity of the liquid flowing laterally along the surface of the microfiltration filter medium, thereby physically cleaning the microfiltration filter medium.

16. A method as claimed in claim 15, wherein said microfiltration filter medium comprises a microfiltration filter tube, the duration of each such periodic increase in circulation velocity is within the range of from about 5 seconds to about 60 seconds, the interval between such periodic increases does not exceed about 20 minutes, and the circulation velocity is increased to a value within the range of from about 10 to about 20 ft. per. sec.

17. Apparatus for increasing the time-averaged crossflow filtration flux of a liquid through a porous microfiltration filter medium over the period of a filtration run, comprising:
a) a porous microfiltration filter medium;
b) means for flowing a liquid transversely through said microfiltration filter medium, including means for establishing a pressure differential across from said microfiltration filter medium; and
c) means for maintaining the filtration flux rate through said microfiltration filter medium at a preselected substantially constant value greater than the equilibrium flux rate during the filtration run, including means for applying a variable throttling pressure on the filtrate side of said microfiltration filter medium and for reducing said throttling pressure during the run to control the instantaneous value of said pressure differential as required to maintain said preselected flux rate.

18. Apparatus for increasing the time-averaged crossflow filtration flux of a liquid through a porous microfiltration filter medium over the period of a filtration run, comprising:
a) a porous microfiltration filter medium;
b) means for flowing the liquid transversely through said microfiltration filter medium, including means for establishing a pressure differential across said microfiltration filter medium; and
c) means for gradually increasing the volume of the liquid being filtered by commencing the filtration run at essentially zero and steadily increasing said volume to the desired operational volume over a sufficiently extended period of time to substantially prevent the intrusion of the particles of material being filtered out of the liquid into said microfiltration filter medium per se.

* * * * *

UNITED STATES PATENT AND TRADEMARK OFFICE
CERTIFICATE OF CORRECTION

PATENT NO. : 5,047,154

DATED : September 10, 1991

INVENTOR(S) : Daniel L. Comstock, et al.

It is certified that error appears in the above-identified patent and that said Letters Patent is hereby corrected as shown below:

Claim 8, col. 14, line 26, change "claim 5" to --claim 3--.

Signed and Sealed this

Nineteenth Day of January, 1993

Attest:

DOUGLAS B. COMER

Attesting Officer

Acting Commissioner of Patents and Trademarks